(12) United States Patent
Wiest

(10) Patent No.: US 12,320,932 B2
(45) Date of Patent: Jun. 3, 2025

(54) X-RAY RADIATION DETECTOR HAVING A SEMICONDUCTOR BODY, AN ELECTRICALLY CONDUCTIVE WINDOW LAYER, AND AN ELECTRICALLY CONDUCTIVE BAR STRUCTURE, AND OPERATION METHOD

(71) Applicant: KETEK GmbH Halbleiter—und Reinraumtechnik, Munich (DE)

(72) Inventor: Florian Wiest, Munich (DE)

(73) Assignee: KETEK GmbH Halbleiter—und Reinraumtechnik, Munich (DE)

( * ) Notice: Subject to any disclaimer, the term of this patent is extended or adjusted under 35 U.S.C. 154(b) by 274 days.

(21) Appl. No.: 18/168,877

(22) Filed: Feb. 14, 2023

(65) Prior Publication Data
US 2023/0266488 A1  Aug. 24, 2023

(30) Foreign Application Priority Data
Feb. 22, 2022  (DE) .......................... 102022104133.6

(51) Int. Cl.
*G01T 1/24*  (2006.01)
*G01T 1/29*  (2006.01)
*H01J 5/18*  (2006.01)

(52) U.S. Cl.
CPC ............ *G01T 1/241* (2013.01); *G01T 1/2928* (2013.01); *H01J 5/18* (2013.01); *H01J 2235/183* (2013.01)

(58) Field of Classification Search
CPC ....... A61B 6/42; A61B 6/4208; A61B 6/4233; A61B 6/4241; A61B 6/4258; A61B 6/4283; A61B 6/4291; G01T 1/24; G01T 1/241; G01T 1/243; G01T 1/244; G01T 1/246; G01T 1/247; G01T 1/248; G01T 1/249;
(Continued)

(56) References Cited

U.S. PATENT DOCUMENTS 5,164,809 A * 11/1992 Street .................. H10F 39/15
250/370.01
5,381,014 A * 1/1995 Jeromin ............ H01L 27/14609
250/580
(Continued)

FOREIGN PATENT DOCUMENTS

CN 104062676 A 9/2014
DE 102012012296 B4 1/2014
(Continued)

OTHER PUBLICATIONS

Hsiu-An, G. et al., "Silicon- and oxygen-codoped graphene from polycarbosilane and its application in graphene/n-type silicon photodetectors," Elsevier, Applied Surface Science, vol. 64, Sep. 8, 2018, 6 pages.
(Continued)

*Primary Examiner* — Allen C. Ho
(74) *Attorney, Agent, or Firm* — Slater Matsil, LLP

(57) ABSTRACT

In an embodiment a radiation detector includes a semiconductor body configured to detect X-rays having a radiation entrance side, an electrically conductive window layer areally arranged to the radiation entrance side, the window layer having boron and/or carbon and having a thickness of at most 20 nm and an electrically conductive bar structure on the window layer and in electrical contact with the window layer.

17 Claims, 5 Drawing Sheets

(58) Field of Classification Search
CPC ....... G01T 1/29; G01T 1/2914; G01T 1/2921; G01T 1/2928
USPC .................................. 378/98.8; 250/370.09
See application file for complete search history.

(56) References Cited

U.S. PATENT DOCUMENTS

| | | | | |
|---|---|---|---|---|
| 5,581,087 | A * | 12/1996 | Uddin | H10F 77/496 250/370.11 |
| 6,198,800 | B1 * | 3/2001 | Garland | H04N 25/30 348/E3.019 |
| 6,455,858 | B1 * | 9/2002 | Patt | H10F 30/29 257/E27.128 |
| 7,834,321 | B2 * | 11/2010 | Yorkston | G21K 4/00 250/370.09 |
| 8,237,126 | B2 * | 8/2012 | Von Kanel | H10F 39/014 250/338.4 |
| 8,384,041 | B2 * | 2/2013 | Tredwell | H04N 25/63 250/370.11 |
| 8,450,820 | B2 * | 5/2013 | Nanver | H10F 77/206 257/E31.124 |
| 8,581,200 | B2 * | 11/2013 | Engel | G01T 1/2928 250/370.09 |
| 8,698,091 | B2 * | 4/2014 | Decker | H01L 29/868 250/336.1 |
| 9,075,150 | B2 * | 7/2015 | Tredwell | G01T 1/247 |
| 9,514,854 | B2 | 12/2016 | Pahlke et al. | |
| 9,613,993 | B2 * | 4/2017 | Sadrozinski | H10F 39/802 |
| 10,056,425 | B2 * | 8/2018 | Cao | H10F 71/127 |
| 10,636,614 | B2 * | 4/2020 | Sommer | H01J 5/18 |
| 11,367,747 | B2 * | 6/2022 | Von Känel | H10F 30/225 |
| 2019/0214217 | A1 | 7/2019 | Sommer et al. | |

FOREIGN PATENT DOCUMENTS

| | | |
|---|---|---|
| DE | 102014103546 A1 | 8/2015 |
| DE | 102012107342 B4 | 10/2019 |

OTHER PUBLICATIONS

Peirui, J. et al., "High-performance photodetector based on an interface engineering-assisted graphene/silicon Schottky junction," Microsystems & Nanoengineering, https://www.nature.com/articles/s41378-021-00332-4, vol. 8, Jan. 7, 2022, 9 pages.

* cited by examiner

X-RAY RADIATION DETECTOR HAVING A SEMICONDUCTOR BODY, AN ELECTRICALLY CONDUCTIVE WINDOW LAYER, AND AN ELECTRICALLY CONDUCTIVE BAR STRUCTURE, AND OPERATION METHOD

CROSS-REFERENCE TO RELATED APPLICATIONS

This application claims the benefit of German Application No. 102022104133.6, filed on Feb. 22, 2022, which application is hereby incorporated herein by reference.

TECHNICAL FIELD

A radiation detector for X-rays is specified. In addition, an operating method for such a radiation detector is provided.

BACKGROUND

German Patent DE 10 2012 012 296 B4 refers to a radiation detector for X-rays.

Radiation transmission windows for X-rays are known from German Patent Application DE 10 2014 103 546 A1 and German Patent DE 10 2012 107 342 B4.

Patent Application US2019/0214217 A1 refers to radiation windows for X-rays containing boron.

SUMMARY

Embodiments provide a radiation detector which is radiation-hard and which has a high sensitivity in the low-energy range. Further embodiments provide a corresponding operating method.

According to at least one embodiment, the radiation detector comprises a semiconductor body. The semiconductor body is configured for detecting the X-ray radiation. In particular, the semiconductor body comprises a semiconductor region provided for absorbing the X-ray radiation to be detected. For example, the semiconductor body is based on silicon, Si, or on Germanium, Ge.

According to at least one embodiment, the semiconductor body comprises a radiation entrance side. The radiation entrance side is preferably a main side and a boundary surface of the semiconductor body. According to an embodiment, the X-ray radiation to be detected enters the semiconductor body at the radiation entrance side. The semiconductor region provided for absorbing the X-ray radiation to be detected may be located directly or close to the radiation entrance side. Close means, for example, that a distance between the radiation entrance side and the aforementioned semiconductor region is at most 100 nm or at most 30 nm.

According to at least one embodiment, the radiation detector comprises one or more electrically conductive window layers. The at least one or preferably exactly one window layer is attached in particular in a planar manner to the radiation entrance side.

According to at least one embodiment, the at least one window layer comprises boron, B, and/or carbon, C. In particular, the at least one window layer comprises either B or C.

According to at least one embodiment, the at least one window layer has a thickness of at most 50 nm or of at most 20 nm or of at most 10 nm or of at most 5 nm or of at most 2 nm. For example, the thickness of the at least one window layer is at one atomic layer or at two or at more than two atomic layers.

According to at least one embodiment, the radiation detector comprises one or more electrically conductive bar structures. The at least one and preferably exactly one bar structure is located directly or indirectly at the window layer. Furthermore, the at least one bar structure is in electrical contact with the window layer.

In at least one embodiment, the radiation detector, which is configured for the detection of X-ray radiation, comprises:
a semiconductor body for detecting the X-radiation having a radiation entrance side,
an electrically conductive window layer, which is applied areally to the radiation entrance side, comprising boron and/or carbon and having a thickness of at most 20 nm, and
an electrically conductive bar structure on the window layer and in electrical contact with the window layer.

In particular, due to the window layer serving as a current expander, the window layer can be used as part of an electrode. In this case, a material of the window layer only needs to have a comparatively low electrical conductivity due to the bar structure. Thus, electrical transversal conduction can be mainly effected by the bar structure. The bar structure therefore only needs to cover a comparatively small proportion of the area of the radiation entrance side. Since the window layer can be made of a material that only weakly absorbs low-energy X-rays in particular, a detection behavior for low-energy X-rays can be improved. Low-energy X-ray refers in particular to radiation with photon energies between 50 eV and 2 keV inclusive.

According to at least one embodiment, the area fraction of the radiation entrance side covered by the bar structure is at most 30% or at most 20% or at most 10% or at most 5%. Alternatively or additionally, this proportion is at least 0.5% or at least 2% or at least 5%.

According to at least one embodiment, the window layer is made of graphene.

According to at least one embodiment, the window layer is made of borophene.

According to at least one embodiment, the bar structure is directly attached to the window layer. In this case, the bar structure is located, for example, partially or completely on a side of the window layer facing away from the semiconductor body. The bar structure may then be attached at a distance from the semiconductor body and may contact the window layer. Alternatively or additionally, the bar structure is located, for example, partially or completely between the semiconductor body and the window layer. The bar structure can thus contact both the semiconductor body and the window layer.

According to at least one embodiment, the window layer extends without gaps over part or all of the radiation entrance side. The window layer or the window layers or at least one of the window layers can be planar in shape.

According to at least one embodiment, the window layer has an area of at least 1 mm2 or of at least 0.1 cm2 or of at least 1 cm2. This area of the window layer may be smaller than or equal to the area of the radiation entrance side, which in turn may be larger than or equal to an area of the semiconductor region provided for absorbing the X-rays to be detected, in each case as seen in plan view of the radiation entrance side.

According to at least one embodiment, the bar structure comprises one or more metal grids. The at least one metal grid comprises one or more bars. All or some of the bars may be oriented parallel to each other, for example, with a tolerance of at most 30° or of at most 10° or of at most 2°. Alternatively or additionally, at least some of the bars are oriented perpendicular to each other, as seen in plan view of the radiation entrance side. This applies, for example, with a tolerance of at most 30° or of at most 10° or of at most 2°. Thus, the bar structure may include bars extending transversely to each other and longitudinally to each other.

Bar structure means in particular that at least one bar is present. A bar is, for example, a straight and/or an unbranched metal strip. A bar means, for example, that a longitudinal extension exceeds a transverse extension by at least a factor of five or by at least a factor of 10 or by at least a factor of 20. In particular, intersecting bars are not considered to be branching if an angle of intersection is at least 45° or at least 60° or at least 80°.

It is possible for the bar structure to include at least 10 or at least 100 or at least 500 of the bars. Alternatively or additionally, at most 104 or at most 1000 of the bars are present.

According to at least one embodiment, a distance between at least some of the bars is at least 0.1 µm or at least 1 µm or at least 10 µm or at least 30 µm or and at most 1 mm. Alternatively, this distance is at most 1 mm or at most 0.2 mm or at most 0.1 mm or at most 30 µm. This distance applies in particular to bars oriented longitudinally to one another and/or as seen in plan view of the radiation entrance side.

According to at least one embodiment, a thickness of the bars is at least 10 nm or at least 20 nm or at least 30 nm. Alternatively or additionally, this thickness is at most 400 nm or at most 200 nm or at most 100 nm.

According to at least one embodiment, the thickness of the bars is at least twice or at least five times or at least ten times the thickness of the at least one window layer. Alternatively or additionally, the thickness of the bars is at most 1000 times or at most 200 times or at most 40 times the thickness of the at least one window layer.

According to at least one embodiment, a width of the bars is greater than the thickness of the bars by at least a factor of 2 or by at least a factor of 10. Alternatively or additionally, this difference is at most a factor 200 or at most a factor 40.

According to at least one embodiment, a dielectric insulation layer is located directly between the semiconductor body and the window layer, either in areas or over the entire surface. 'Directly between' means in particular that the insulation layer touches both the semiconductor body and the window layer, in particular touches the entire surface. For example, the insulation layer is made of an electrically insulating oxide or nitride such as SiO2, Si3N4 or BN, boron nitride.

According to at least one embodiment, the window layer is located directly on the radiation entrance side in some areas or over the entire surface. This means that the window layer can directly cover the radiation entrance side.

According to at least one embodiment, the semiconductor body comprises a p-doped layer at the window layer and/or an n-doped layer at a side of the p-doped layer facing away from the window layer, or vice versa. It is possible that a space charge region is formed between the p-doped layer and the n-doped layer during operation of the radiation detector.

According to at least one embodiment, the p-doped layer is a Si layer.

According to at least one embodiment, the n-doped layer is a Si layer.

According to at least one embodiment, the p-doped layer is thinner than the n-doped layer.

According to at least one embodiment, the bar structure is electrically connectable independently of the semiconductor body, as independently of the p-doped layer and the n-doped layer. In particular, the window layer and the bar structure form at least part of an additional electrode.

According to at least one embodiment, the radiation detector further comprises a first electrode at the n-doped layer and a second electrode at the p-doped layer. Preferably, a signal from the radiation detector can be read out via the first and second electrodes.

As an alternative to the additional electrode, it is possible for the bar structure and/or the window layer to be electrically connected to the second electrode. That is, the bar structure, the window layer and the second electrode are then arranged to be at the same electrical potential.

According to at least one embodiment, the first electrode and the second electrode are configured to lead an electrical charge in the semiconductor body resulting from absorbing X-rays out of the semiconductor body, for example, to an external or also internal electronics unit. For example, the electrical charge is proportional to a photon energy of the absorbed photon. Contrary to that, the additional electrode is configured not to be involved in leading the electrical charge in the semiconductor body resulting from absorbing X-rays out of the semiconductor body. That is, measuring the photon energies may be done by the first electrode and by the second electrode only, and a function of the additional electrode may be limited to provide a bias voltage, for example, a constant bias voltage.

According to at least one embodiment, the window layer and the additional electrode are not in direct electrical contact with the semiconductor body. For example, the window layer and the additional electrode are electrically insulated from the semiconductor body. For example, the window layer and the additional electrode are in indirect electrical contact with the semiconductor body, for example, by means of the second electrode. In the latter case, for example, the additional electrode is connected to the second electrode via an electrical resistance and/or a voltage source to provide the voltage difference between V2 and V3.

In addition, an operating method for a radiation detector as described in connection with one or more of the above embodiments is disclosed. Features of the radiation detector are therefore also disclosed for the operating method, and vice versa.

In at least one embodiment, the operating method operates a radiation detector. A voltage V2 at a second electrode is smaller than a voltage V1 at a first electrode, and for a voltage V3 at an additional electrode, the following applies: $1.1 \, V2 \leq V3$ or $1.03 \, V2 \leq V3$ and/or $V3 \leq V2$ or $V3 < V2$ or $V3 < 1.005 \, V2$. At least low-energy X-rays are detected.

For example, $V=|V1-V2|$ is at least 5 V or at least 20 V and/or at most 200 V or at most 500 V. For example, $V1=0$ V and $-60 \, V \leq V2 \leq -120 \, V$. For example, $V=|V2-V3|$ is at least 0 V or at least 0.3 V and/or at most 3 V or at most 10 V, where V3 is more negative than V2.

The sign of the applied voltages depends on the doping in the semiconductor. For the case of a weakly n-doped substrate with a $p^+$ contact on the entrance window side, a so-called p-on-n structure, the preceding voltage specifications apply. For the case of a weakly p-doped substrate with an $n^+$ contact, a so-called n-on-p structure, the signs of the voltages have to be reversed.

A numerical example to illustrate:

p-on-n: V3=0 V, V2=−100 V and V3=−101 V, correspondingly n-on-p: V3=0 V, V2=+100 V and V3=+101 V.

According to at least one embodiment, the radiation detector is configured to detect X-rays with a photon energy of at least 0.1 keV and/or of at most 25 keV. In particular, the radiation detector is set up for photon energies in the low-energy range of at least 50 eV or of at least 100 eV and up to at least 2 keV.

BRIEF DESCRIPTION OF THE DRAWINGS

In the following, a radiation detector described herein and an operating method described herein are explained in more detail with reference to the drawing on the basis of embodiment examples. Identical reference signs indicate identical elements in the individual figures. However, no references are shown to scale; rather, individual elements may be shown exaggeratedly large for better understanding.

In the figures.

DETAILED DESCRIPTION OF ILLUSTRATIVE EMBODIMENTS

Figure 1:
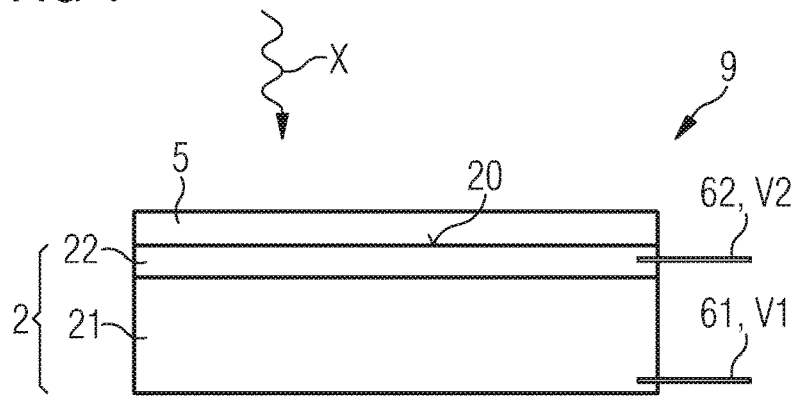
FIGS. 1 and 2 show schematic cross-sectional views of variations of radiation detectors.

FIG. 1 illustrates a variation 9 of a radiation detector. The variation 9 comprises a semiconductor body 2, which is based in particular on Si. At a radiation entrance side 20, the semiconductor body 2 comprises a p-doped layer 22. At a side of the p-doped layer 22 facing away from the radiation entrance side 20, there is an n-doped layer 21. Furthermore, a dielectric insulation layer 5 is provided at the radiation entrance side 20, which is, for example, made of SiO2 and which, for example, has a thickness between 20 nm and 200 nm inclusive.

A first electrode 61 and a second electrode 62, to which voltages V1, V2 are applied, are located on the layers 21, 22.

During operation of the variation 9, X-ray radiation X enters the semiconductor body 2 through the radiation entrance side 20.

Thus, the variation 9 according to FIG. 1 has an oxide entrance window 5. Due to the dielectric insulation layer 5, surface states on the semiconductor body 2 are saturated, which is why secondary electrons caused by the X-rays X are absorbed less compared to a non-passivated or metal-passivated Si surface. This results in a good low energy performance of variation 9 in combination with a high transmission for the X-rays X. However, the effect strongly depends on the oxide quality, which is why the performance deteriorates with increasing irradiation. In addition, this variation 9 has a relatively low beam hardness. That is, at high cumulative radiation doses, sensitivity and/or lifetime of this variation 9 decreases significantly.

Figure 2:
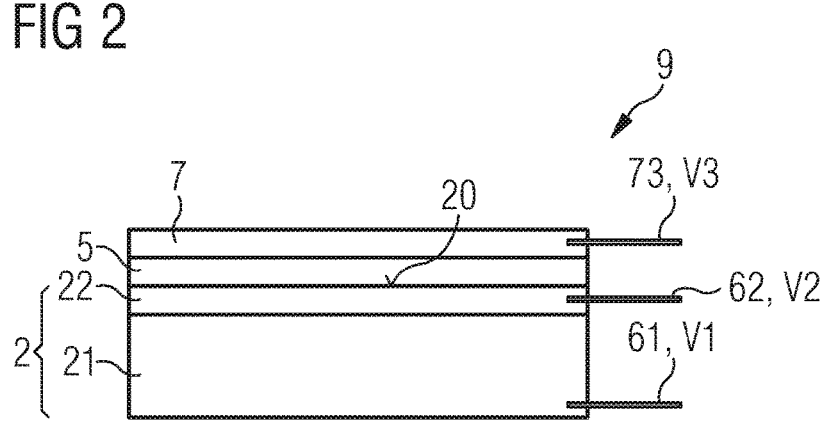

Compared to FIG. 1, variation 9 according to FIG. 2 additionally has a metal layer 7 on the insulation layer 5, which is connected to a further electrode 73. A voltage V3, which is more negative than the voltage V2, is applied to the further electrode 73.

This combination of insulation layer 5 and metal layer 7 on the semiconductor body 2 is also referred to as MOS entrance window, where MOS stands for metal-oxide-semiconductor. The metal layer 7 is, for example, made of aluminum with a thickness of, for example, 40 nm. The more negative voltage V3 at the metal layer 7 pushes the electrons caused by the X-rays X into the semiconductor body 2, thereby very effectively preventing absorption of these secondary charge carriers. This effect is relatively independent of the oxide quality, which is why this configuration is significantly more radiation-hardened. However, the additional metal layer 7 absorbs a comparatively large fraction of the incident X-rays, resulting in poorer low-energy performance. The operation of such a variation can be found, for example, in more detail in German Patent DE 10 2012 012 296 B4, which patent, in particular paragraphs 11, 12, 15, 30 and 38 to 40, is hereby incorporated herein by reference.

In particular, one goal of a radiation detector 1 described here is to achieve a combination of the advantages of both variations 9 of FIGS. 1 and 2. For this purpose, the transmission of the metal layer 7 in the MOS configuration of FIG. 2 is to be increased.

Figure 3:
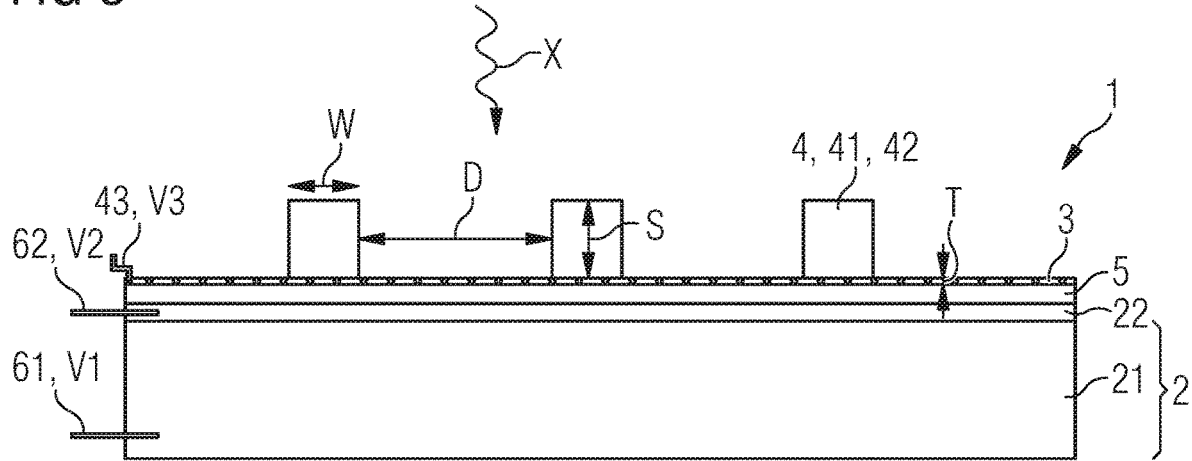
FIG. 3 is a schematic sectional view of an embodiment of a radiation detector described herein.

In the example of the radiation detector 1 shown in FIG. 3, the metal layer 7 is replaced by a window layer 3 together with a bar structure 4, also referred to as ridge structure. The window layer 3 and the bar structure 4 together form at least part of an additional electrode 43 to which the voltage V3 can be applied.

The window layer 3 is, for example, a graphene layer or a borophene layer with a thickness T of at most 20 nm, in the case of graphene preferably between 2 nm and 15 nm or between 2 nm and 5 nm, in the case of borophene there may be few monolayers, like at most 10 or at most 5 monolayers. Directly applied to the window layer 3 is the bar structure 4, which is, for example, made of aluminum and in particular has a thickness S between 30 nm and 50 nm. A distance D between adjacent bars 42 of a metal grid 41, which can form the bar structure 4, is, for example, between 3 µm and 30 µm. A width W of the metal grid 41 is, for example, between 1 µm and 5 µm.

For example, the voltage V1 at the first electrode 61 is 0 V when the radiation detector 1 is in operation, and the voltage V2 at the second electrode 62 is between −60 V and −80 V, for example. The voltage V3 at the additional electrode 43 is slightly more negative than the voltage V2. Since the additional electrode 43 is preferably not configured for signal evaluation, no or only small currents flow in the additional electrode 43 as intended.

Figure 4:
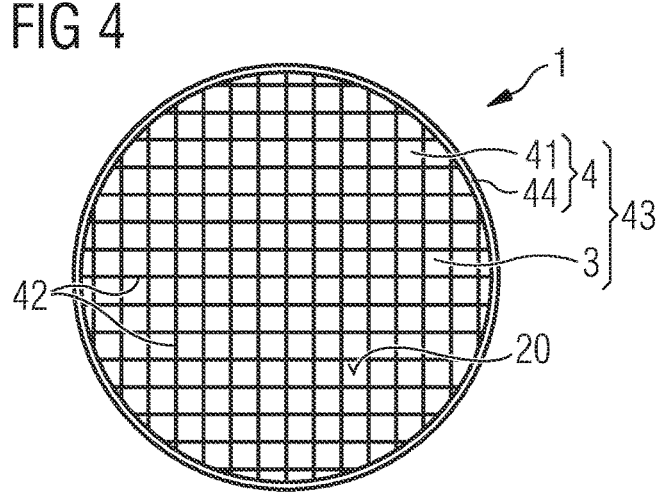
FIGS. 4 to 6 are schematic top views of embodiments of radiation detectors described herein.
Figure 5:
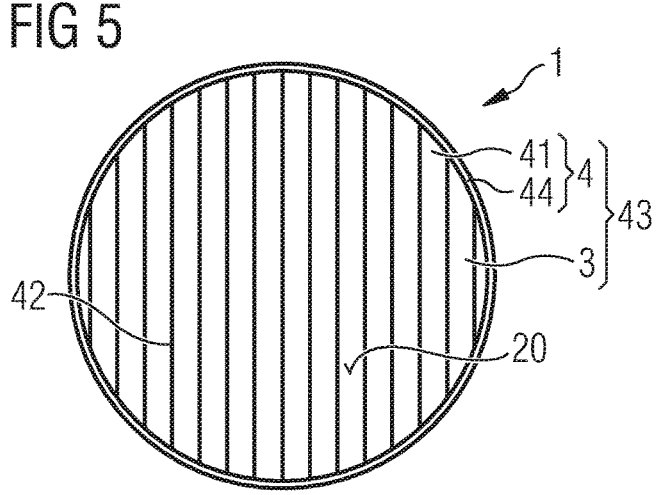
Figure 6:
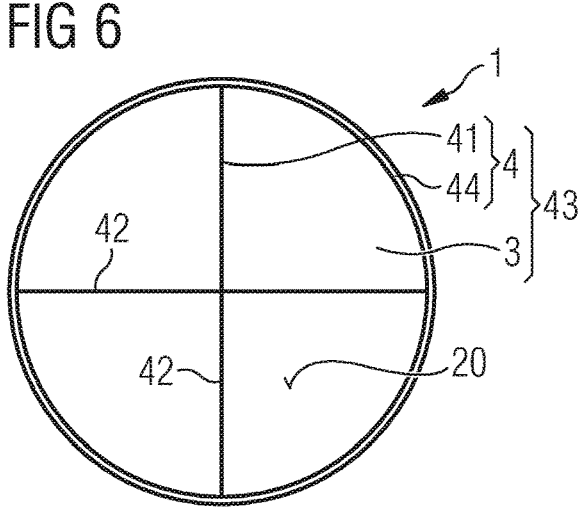

FIGS. 4 to 6 show exemplary top views of the bar structure 4. Referring to FIG. 4, the metal grid 41 has a plurality of the bars 42 intersecting at right angles. The bars 42 define, for example, square or rectangular meshes within which the window layer 3 can be exposed. The metal grid 41 may have the same mesh constant and/or thickness throughout the radiation entrance side 20. As an alternative to a square lattice or rectangular lattice, a particularly regular hexagonal metal grid 41 may also be present, in deviation from the illustration in FIG. 4. A diameter of the radiation entrance side 20 is, for example, between 1 mm and 10 mm.

FIG. 5 shows that the metal grid 41 is formed by parallel bars 42. Thus, there are no intersecting bars 42, unlike in FIG. 4.

According to FIG. 6, only two of the bars 42 are present, crossing each other and forming the metal grid 41. In deviation from the illustration in FIG. 6, it is also possible that only a single bar 42 is present.

According to FIGS. 4 to 6, the bars 42 each run straight. In deviation from this, curved bars 42 or bars 42 with kinks can also be present.

Furthermore, according to FIGS. 4 to 6, a frame 44 is optionally provided in each case. For example, the frame 44 circumscribes the radiation entrance side 20 in a circular manner or, differently than drawn, also as a polygon. The frame 44 can electrically connect the individual bars 42 to one another. It is possible that the frame 44 serves as the contact point of the additional electrode 43. For example, the frame 44 is made of the same material as the bars 42 and the frame 44 may have the same thickness S as the bars 42 or may have a greater thickness.

The full-surface metal layer 7 made of aluminum as shown in FIG. 2 is thus replaced in the radiation detector 1 described here by the full-surface, ultra-thin graphene layer or borophene layer with a thickness T of a few nm with the best possible conductivity. On this graphene layer or borophene layer, the metal support bar structure 4 is applied for better potential distribution. A lattice constant of the electrical support bar structure 4 is chosen as large as possible. The lattice constant results from a sheet resistance and a leakage current between the two potentials.

In all other respects, the comments on FIGS. 1 and 2 apply in the same way to FIGS. 3 to 6.

Figure 7:
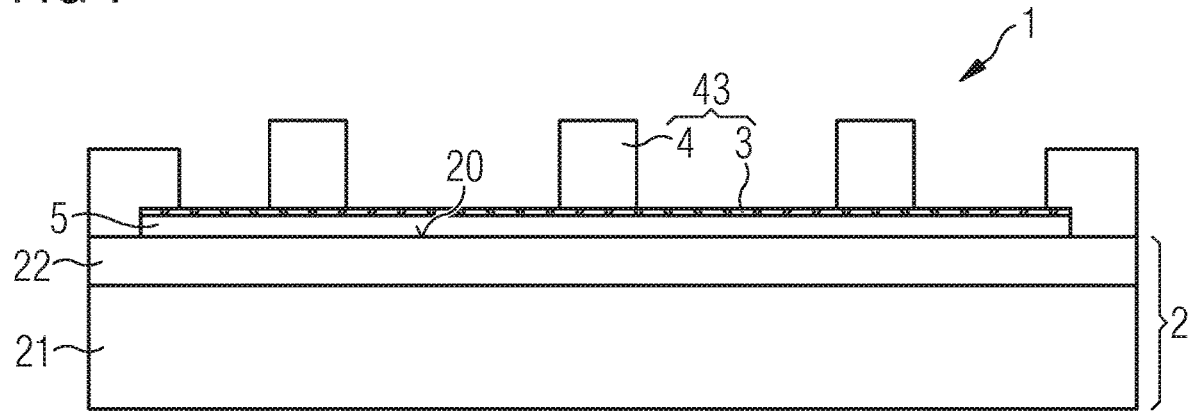
FIGS. 7 to 11 are schematic cross-sectional views of embodiments of radiation detectors described herein.

In the example of FIG. 7, it is shown that the bar structure 4 can project laterally beyond the insulation layer 5 and can be in contact with the p-doped semiconductor layer 22. In this case, V3=V2 is then valid. This configuration is also possible in all other exemplary embodiments and already achieves an improvement with respect to the desired functionality. However, the configuration of FIG. 3 is preferred, according to which V3 can be set independently of V2.

Figure 8:
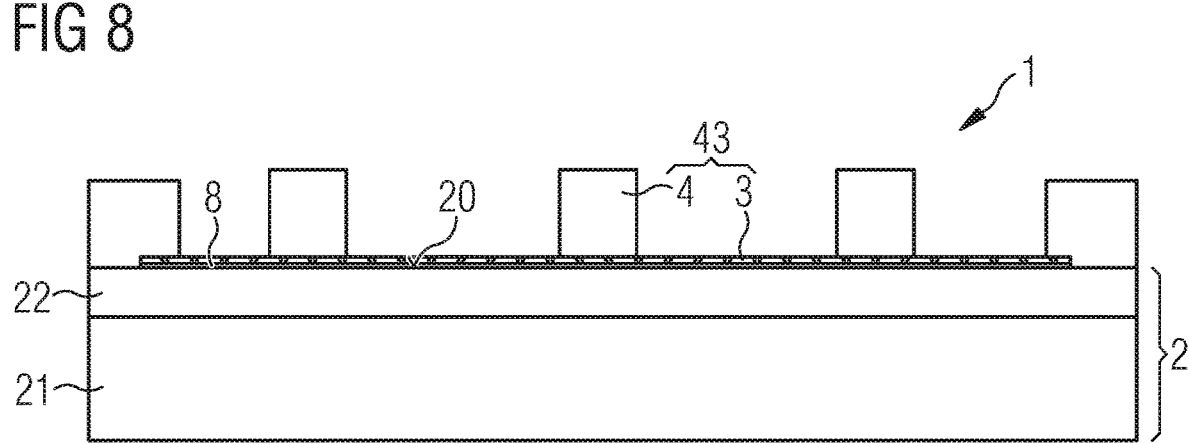

The radiation detector 1 of FIG. 8 comprises an intermediate layer 8 at the radiation entrance side 20. The intermediate layer 8 is, for example, made of electrically insulating SiC. This SiC layer 8 can optionally be formed in situ during the graphene deposition process for the window layer 3 at an appropriate deposition temperature.

Figure 9:
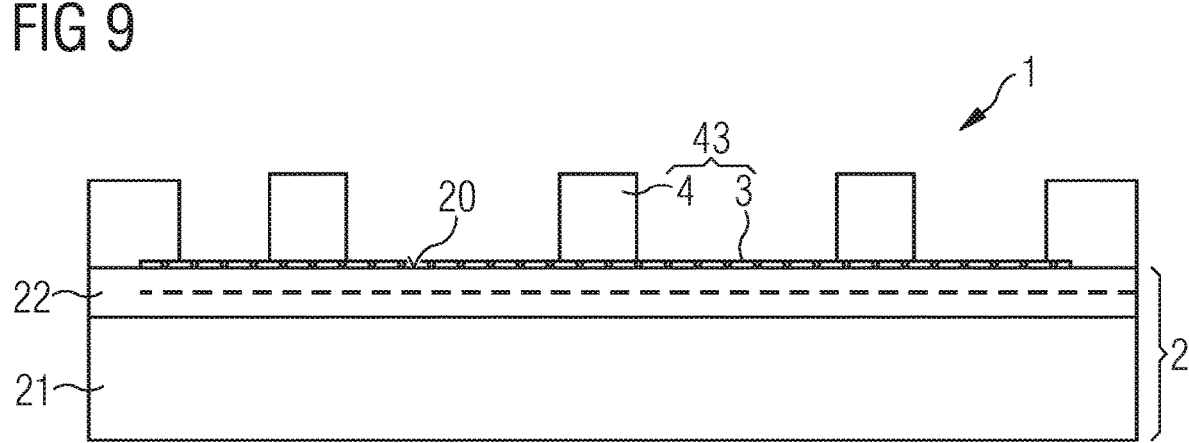

According to FIG. 9, there is no insulation layer 5. The window layer 3, which is made of graphene, for example, thus lies directly on the radiation entrance side 20 of the semiconductor body 2. Surface states are saturated by means of the window layer 3 or accumulating charge carriers can be additionally transported away via the conductive window layer.

Optionally, the semiconductor layer 22 comprises a plurality of sublayers at the radiation entrance side 20. The semiconductor layer 22 can thus be composed of several sublayers, each of which can be made of appropriately doped Si, for example. In this way, it can be achieved that a p-doping in the charge carrier-depleted silicon successively decreases inwardly so that an electric field is always directed into the detector volume and the generated charge carriers are driven toward the anode. This can apply accordingly in all other examples.

Figure 10:
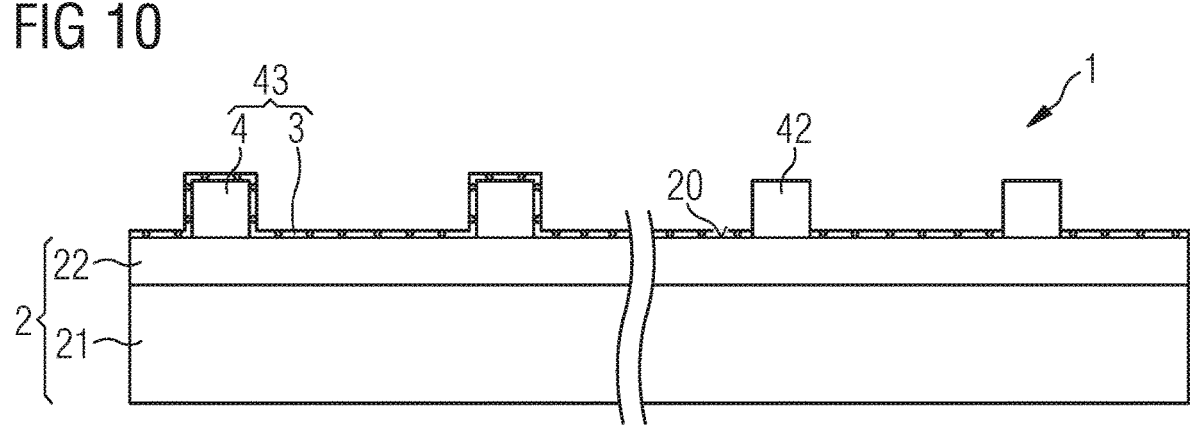

In the example of FIG. 10, it is shown that the bar structure 4 is applied directly to the radiation entrance side 20. The window layer 3 is then applied over the entire surface of the radiation entrance side 20, for example, so that the window layer 3 can partially or completely cover the bar structure 4, see FIG. 10, left side. Alternatively, the window layer 3 can be limited to areas between the bars 42, see FIG. 10, right side.

Figure 11:
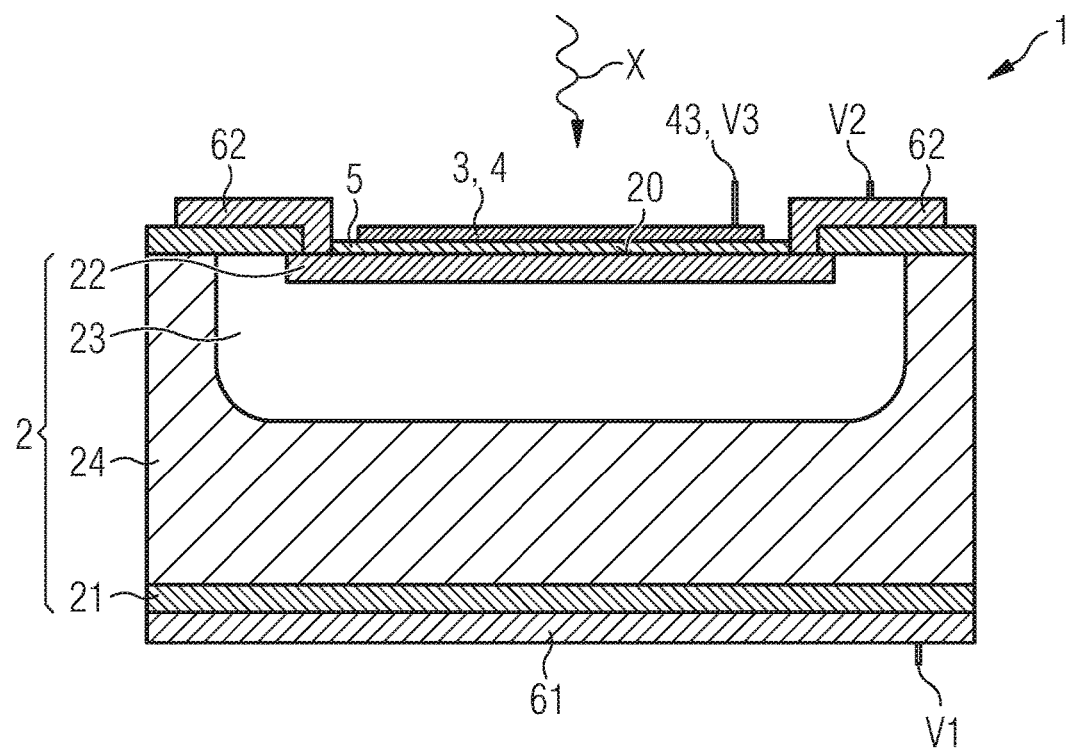

According to FIG. 11, a space charge region 23 is formed between the semiconductor layers 21, 22 during operation, caused by the voltages V1 and V2. The additional electrode 43 can be connected separately from the second electrode 62. The second electrode 62 is, for example, a metallic ring electrode around the radiation entrance side 20. The first electrode 61 may be a flat metal layer on a side of the semiconductor layer 21 facing away from the radiation entrance side 20.

Optionally, the semiconductor body 2 comprises a further n-doped layer 24. The layer 24 is preferably more weakly doped than the layer 21. The space charge region 23 may be formed in the further layer 24.

In all other respects, the comments on FIGS. 1 to 6 apply in the same way to FIGS. 7 to 11, and vice versa.

In another category of examples of the radiation detector 1, no window layer 3 is present. In this case, a bar structure 4 without a window layer is then present, for example, aluminum bars 42 in particular directly on the semiconductor body 2, especially directly on p-doped silicon. Such radiation detectors 1 also bring an improvement with regard to transmission. This applies in particular to small distances between adjacent bars 42 of, for example, at most 0.2 mm or at most 0.1 mm or at most 30 μm. For such radiation detectors 1 without a window layer, the explanations of FIGS. 1 to 11 apply in all other respects in the same way.

Figure 12:
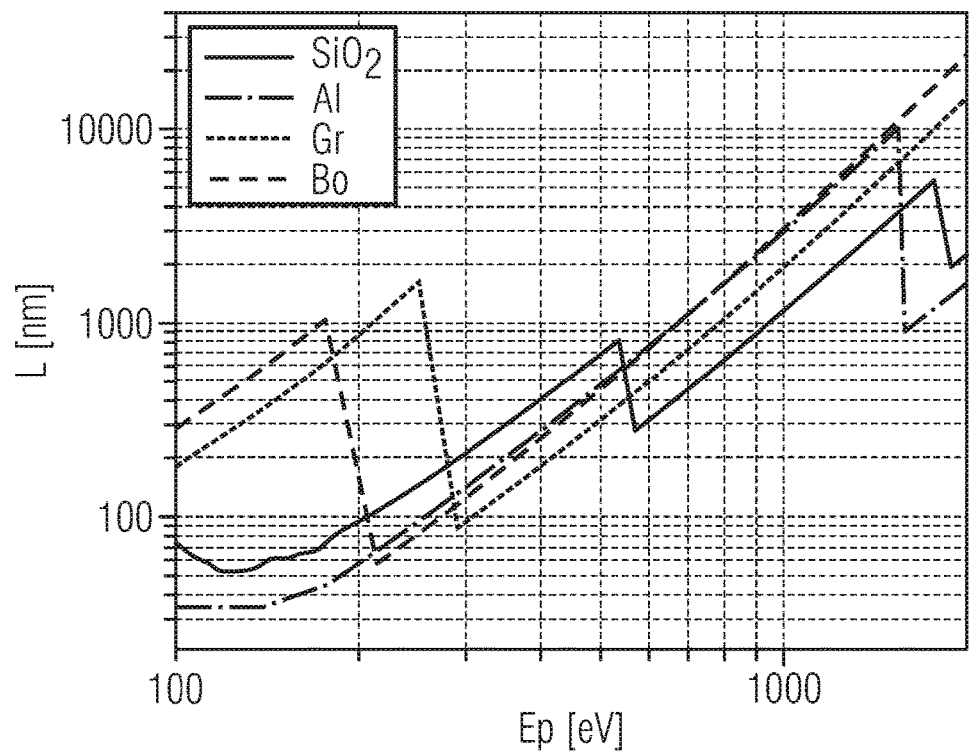
FIG. 12 is a schematic representation of the penetration depth of X-rays into different materials as a function of photon energy.

FIG. 12 shows penetration depths L, also referred to as attenuation length, for various materials as a function of photon energy Ep. In particular, it can be seen that graphene, Gr, and borophene, Bo, exhibit a significantly greater penetration depth L and thus higher transmission for incident radiation in the low-energy range at photon energies Ep around 200 eV than aluminum, Al, and silicon oxide, $SiO_2$. In addition, the layers can be formed much thinner, which further improves the transmission.

Figure 13:
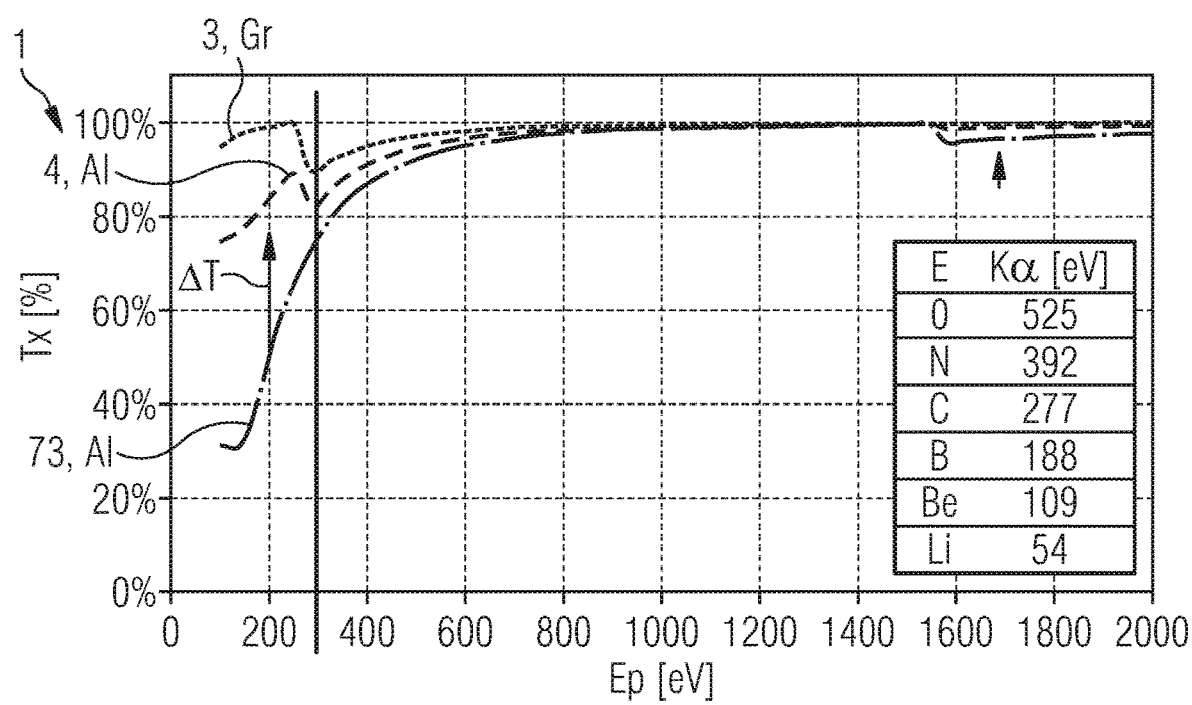
FIG. 13 is a schematic representation of the transmission of radiation entrance windows of radiation detectors for X-rays as a function of photon energy.

FIG. 13 shows a transmission Tx of an additional electrode described here with a 10 nm thick graphene window 3 and a 40 nm thick aluminum bar structure 4, with a metal grid as shown in FIG. 4 with bar widths D of 2 μm and bar spacings D of 10 μm. It can be seen that, compared to a flat metal layer 7 made of 40 nm thick aluminum, the transmission Tx is significantly increased by several tens of percentage points, particularly in the spectral range below 300 eV, for a radiation detector 1 described here, corresponding to a transmission gain ΔT.

Furthermore, the energies of characteristic X-ray emission lines Kα are listed for several elements E in FIG. 13. In the context of material analysis based on the characteristic X-ray emission of elements in methods such as EDX (energy dispersive X-ray spectroscopy), XRF (X-ray fluorescence spectroscopy) or PIXE (particle-induced X-ray emission), the photon energy range from 50 eV to a few 10 keV, corresponding to wavelengths from 25 nm to about 10 pm, is of interest. Therefore, the term 'transmission Tx' refers especially to this energy range and here again specifically to the low-energy part from 50 eV to 2 keV. The table in FIG. 13 shows the energies of the Kα lines of the lightest elements. These energies are to be verified for element determination.

Since the window 3, 4 described here has an increased transmission Tx in the low-energy spectral range, the detection sensitivity in this spectral range is increased.

The components shown in the figures preferably follow one another in the sequence indicated, in particular directly one after the other, unless otherwise described. Components not touching each other in the figures are preferably spaced apart. Insofar as lines are drawn parallel to one another, the associated surfaces are preferably likewise aligned parallel to one another. Furthermore, the relative positions of the drawn components to each other are correctly reproduced in the figures, unless otherwise specified.

The invention described herein is not limited by the description based on the embodiments. Rather, the invention encompasses any new feature as well as any combination of features, which in particular includes any combination of features in the patent claims, even if this feature or combination itself is not explicitly stated in the patent claims or embodiments.

This patent application claims the priority of German patent application 10 2022 104 133.6, the disclosure content of which is hereby incorporated by reference.

What is claimed is:

1. A radiation detector comprising:
   a semiconductor body having a radiation entrance side configured to detect X-rays;
   an electrically conductive window layer areally arranged to the radiation entrance side, the electrically conductive window layer comprising boron and/or carbon, and having a thickness of at most 20 nm; and
   an electrically conductive bar structure on the electrically conductive window layer and in an electrical contact with the electrically conductive window layer.

2. The radiation detector according to claim 1,
   wherein the thickness of the electrically conductive window layer is at most 5 nm,
   wherein the electrically conductive bar structure is directly attached to the electrically conductive window layer, and
   wherein the electrically conductive window layer is without gaps and has an area of at least 1 mm$^2$.

3. The radiation detector according to claim 1, wherein the electrically conductive window layer comprises graphene.

4. The radiation detector according to claim 1, wherein the electrically conductive window layer comprises borophene.

5. The radiation detector according to claim 1, wherein the electrically conductive bar structure is located on a side of the electrically conductive window layer facing away from the semiconductor body.

6. The radiation detector according to claim 1, wherein the electrically conductive bar structure is located between the semiconductor body and the electrically conductive window layer.

7. The radiation detector according to claim 1, wherein the electrically conductive bar structure comprises a metal grid such that the electrically conductive bar structure includes bars extending transversely to and parallel to each other.

8. The radiation detector according to claim 7,
   wherein a distance between at least some of the bars is at least 0.1 μm and at most 1 mm,
   wherein a thickness of the bars is at least 20 nm and at most 200 nm, and
   wherein a width of the bars is larger than the thickness of the bars by at least a factor of two.

9. The radiation detector according to claim 1, further comprising a dielectric insulation layer located directly between the semiconductor body and the electrically conductive window layer, at least in regions.

10. The radiation detector according to claim 1, wherein the electrically conductive window layer is located directly on the radiation entrance side of the semiconductor body, at least in regions.

11. The radiation detector according to claim 1, wherein the semiconductor body comprises a p-doped layer at the electrically conductive window layer and an n-doped layer at a side of the p-doped layer facing away from the electrically conductive window layer.

12. The radiation detector according to claim 11,
    wherein the p-doped layer is a p-doped Si layer,
    wherein the n-doped layer is an n-doped Si layer, and
    wherein the p-doped layer is thinner than the n-doped layer.

13. The radiation detector according to claim 11, further comprising a first electrode at the n-doped layer and a second electrode at the p-doped layer, wherein the electrically conductive bar structure is electrically connectable independently of the p-doped layer and the n-doped layer such that the electrically conductive window layer and the electrically conductive bar structure form an additional electrode.

14. A radiation detector comprising:
    a semiconductor body having a radiation entrance side configured to detect X-rays;
    an electrically conductive window layer areally arranged to the radiation entrance side, the electrically conductive window layer comprising boron and/or carbon, and having a thickness of at most 20 nm;
    an electrically conductive bar structure on the electrically conductive window layer and in an electrical contact with the electrically conductive window layer,
    wherein the semiconductor body is of Si and comprises a p-doped layer at the electrically conductive window layer and an n-doped layer directly at a side of the p-doped layer facing away from the electrically conductive window layer;
    a first electrode at the n-doped layer and a second electrode at the p-doped layer,
    wherein the electrically conductive window layer and the electrically conductive bar structure form an additional electrode,
    wherein the first electrode and the second electrode are configured to lead an electrical charge in the semiconductor body resulting from absorbing the X-rays out of the semiconductor body, and
    wherein the additional electrode is configured not to be involved in leading the electrical charge in the semiconductor body resulting from absorbing the X-rays out of the semiconductor body; and
    a dielectric insulation layer located between the semiconductor body and the electrically conductive window layer so that the electrically conductive window layer and the additional electrode are not in a direct electrical contact with the semiconductor body.

15. A method for operating the radiation detector according to claim 13, the method comprising:
    applying a first voltage at the first electrode;
    applying a second voltage at the second electrode, the second voltage being smaller than the first voltage;
    applying a third voltage at the additional electrode for which the following is true: $1.1\ V2 \leq V3 \leq V2$; and
    detecting low-energy X-ray radiation.

16. The method according to claim 15,
    wherein $1.03\ V2 \leq V3 < 1.005\ V2$ applies, and
    wherein $-60\ V \leq V2 \leq -120\ V$ and $0.3\ V \leq |V2-V3| \leq 3\ V$.

17. The method according to claim 15, wherein an energy of the low-energy X-ray radiation to be detected is between 0.05 keV and 2 keV inclusive.

* * * * *